United States Patent [19]

Kolbe et al.

[11] 4,239,973

[45] Dec. 16, 1980

[54] DEVICE FOR THE SURFACE TREATMENT OF FILM WEBS BY MEANS OF ELECTRICAL CORONA DISCHARGE

[75] Inventors: Andreas Kolbe, Wiesbaden; Peter Dinter, Hallgarten, both of Fed. Rep. of Germany

[73] Assignee: Hoechst Aktiengesellschaft, Frankfurt am Main, Fed. Rep. of Germany

[21] Appl. No.: 965,468

[22] Filed: Nov. 30, 1978

[30] Foreign Application Priority Data

Dec. 2, 1977 [DE] Fed. Rep. of Germany ....... 2753750

[51] Int. Cl.[3] .......... B01J 19/12

[52] U.S. Cl. .......... 250/531; 422/186; 425/174.4; 425/174.8 E

[58] Field of Search .......... 250/531; 422/186; 425/174.4, 174.8 E; 204/164, 165

[56] References Cited

U.S. PATENT DOCUMENTS

| | | | |
|---|---|---|---|
| 2,802,085 | 8/1957 | Rothacker | 219/10.53 |
| 2,864,755 | 12/1958 | Rothacker | 250/531 |
| 3,111,471 | 11/1963 | Evans et al. | 250/531 |
| 3,684,364 | 8/1972 | Schmidlin | 355/3 R |
| 3,871,980 | 3/1975 | Butcher | 250/531 |
| 4,059,497 | 11/1977 | Kolbe et al. | 250/531 |
| 4,153,560 | 5/1979 | Dinter et al. | 250/531 |

FOREIGN PATENT DOCUMENTS 1361835 7/1974 United Kingdom .

*Primary Examiner*—Deborah L. Kyle
*Attorney, Agent, or Firm*—Schwartz, Jeffery, Schwaab, Mack, Blumenthal & Koch

[57] ABSTRACT

Disclosed is a device for the surface treatment of film webs by means of an electrical corona discharge, comprising: at least one grounded counter-electrode comprised of a point electrode; at least one roll electrode rotatably positioned adjacent to said counter-electrode, the roll electrode comprising an outer tube comprised of dielectric material, an inner tube comprised of dielectric material fitted coaxially inside of the outer tube and a plurality of electrodes carried by the inner tube; and a supply of A.C. voltage for the electrodes.

19 Claims, 5 Drawing Figures

FIG.1
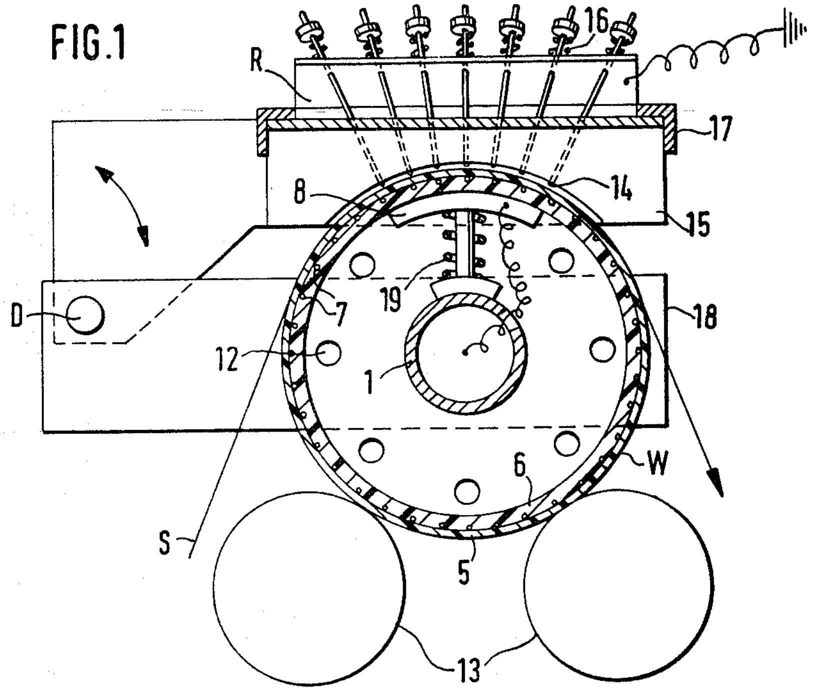
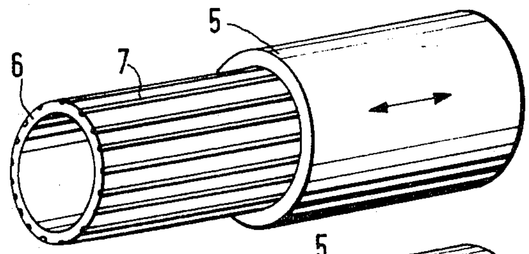
FIG.3
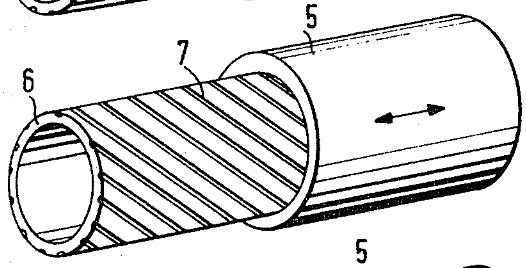
FIG.4
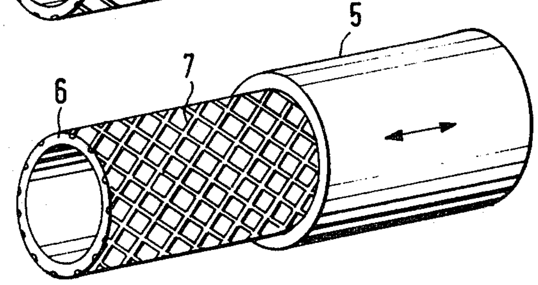
FIG.5

DEVICE FOR THE SURFACE TREATMENT OF FILM WEBS BY MEANS OF ELECTRICAL CORONA DISCHARGE

BACKGROUND OF THE INVENTION

The present invention relates to an A.C. corona device for treating the surfaces of plastics films or metal foils.

In processing films as well as in manufacturing composite films, it is known in the prior art to subject the film surfaces to a corona discharge in order to render them suitable for printing or to increase their bond strengths. These methods involve passing the film to be treated over an electrically grounded support surface, such as a roll, a drum, or an endless belt, and subjecting the film surface which is not in contact with the support surface to an electrical corona discharge produced by supplying high-frequency, high-voltage A.C. to an electrode arranged at a distance from the support surface.

The known methods and devices operating according to this basic principle differ in reality only in the design of the support surface serving as a counter-electrode. These surfaces may, for example, comprise a central roll with several electrodes, several support rolls with corresponding electrodes or the like. The dielectric materials used to insulate the counter-electrode are, for example: mica, glass, ceramics, plastic films or special qualities of rubber. The electrodes conventionally employed may comprise a plate, wire, comb, knife, half-shell, spring or spindle-shaped electrode. The type of generator used may, for example, be a low-frequency, medium-frequency or high-frequency generator.

In addition, methods are known, such as those described in German Offenlegungsschrift No. 1,404,413, U.S. Pat. No. 2,864,755 and U.S. Pat. No. 2,802,085, in which the above-described conditions have been reversed, i.e., the film is subjected to an electrical corona discharge through an electrode insulated by means of a dielectric material.

The two basic systems just described (bare electrode/insulated counter-electrode or insulated electrode/bare counter-electrode) show general imperfections which are more or less troublesome in practice. When using a bare electrode and an insulated counter-electrode, one drawback, among others, is the relatively high cost resulting from damage to the insulation of the counter-electrode due to punctures, injuries such as knife cuts or the like or the introduction of moisture into the pretreating station. In such cases, the rolls which are usually insulated by special rubber layers, silicone layers, etc. must be sent to a rubberizing and vulcanizing plant for repair. As is known from experience, the repair procedure is technically quite involved and takes a prolonged period of time, so that the plant concerned is obliged to keep expensive spare parts in stock.

The problems outlined above have undoubtedly induced the development of the alternative method in which, preferably, cylinders or rolls covered with a dielectric material are used as electrodes, as already mentioned. The use of small electrode rolls certainly has some advantages. Apart from a simpler design and easier handling when mounting and dismounting, there is also reduction in the cost of repair achieved by using exchangeable dielectric linings in the form of hose materials which may be fitted or shrunk-fit in situ, instead of the vulcanizable, permanent insulating layers. As far as the effectiveness of the pre-treatment is concerned, i.e., the modification of surface (measured as the surface tension in mN/m) obtained on the treated substrate, the first-mentioned method is definitely superior to the alternative method, due to the possibility of combining the counter-electrode, necessarily designed as a continuous surface (insulated cylinder), with a point electrode of any shape (wire, comb, threaded pin or knife-shaped electrode, ect.). This is all the more understandable when one considers the preferred electrode shape, namely, a cylindrical roll body of 80 to 100 mm diameter, which therefore differs considerably from the sharp-edged electrode profile which is generally regarded as ideal.

The device proposed in German Utility Model No. 74 14 967 appears to be an attempt to solve the problems mentioned above. In this device, profiled bare electrode rolls are used in combination with an insulated counter-electrode roll. There are, however, no clearly apparent advantages as compared to a stationary electrode profile (knife, comb-shaped electrode, etc.) and, additionally, the desirable principle of the insulated electrode has been abandoned. Consequently, the patented device can only be regarded as a compromise resulting from the necessity of improving a system which is not optimal and the desire to maintain a given concept.

The electrode described in German Offenlegungsschrift No. 2,556,228, on the other hand, constitutes a practically optimal device within the category of cylinder or roll electrodes. In spite of a greatly improved utilization of capacity as compared with conventional electrodes, several electrodes must still be used in the case of high treatment speeds. This may be considered as a certain disadvantage in view of the larger technical expenditure and higher cost required at the outset.

In equipment used for treating materials of greater widths, in which the diameter of the roll electrode must be increased for constructional reasons, e.g., because of deformation of the rolls, the disadvantages of the conventional cylinder or roll electrodes are far more evident. In this instance, a considerably reduced energy density is accompanied by an increase of the mass of current-carrying parts and thus of the electrical losses due to radiation, since the entire roll body is live, although only a small portion thereof is required as the discharge surface.

SUMMARY OF THE INVENTION

It is, therefore, an object of the present invention to provide an improved corona device.

It is another object of the present invention to provide an improved corona device of simple construction, which may be quickly repaired and employed at high travelling speeds of the films, and which yields a higher energy density for the discharge process.

In accomplishing the foregoing objects, there has been provided in accordance with the present invention a device for the surface treatment of film webs by means of an electrical corona discharge, comprising: at least one grounded counter-electrode comprised of a point electrode; at least one roll electrode rotatably positioned adjacent to the counter-electrode, the roll electrode comprising an outer tube comprised of dielectric material, an inner tube comprised of dielectric material fitted coaxially inside of the outer tube and a plurality of electrodes carried by the inner tube; and means for supplying an A.C. voltage to the electrodes. Preferably, the A.C. voltage supplying means comprises a generator, most preferably a high frequency voltage generator, a slip ring segment contacting the electrodes, a lead wire connecting the generator and said slip ring segment and optionally a transformer connected to the generator. Also, the roll electrode preferably comprises a central axle, two annular end pieces concentrically and rotatably mounted on the axle so that the end pieces support the outer tube at each end thereof.

According to one preferred embodiment, the axle is a hollow axle which includes bores in the wall thereof, the end pieces include bores axially therethrough, and the device further includes means for circulating a cooling fluid through the axle via the bores.

Other objects, features and advantages of the invention will become apparent from the detailed description of preferred embodiments which follows when considered together with the attached drawings.

BRIEF DESCRIPTION OF THE DRAWINGS

In the drawings:

FIG. 1 is a cross-sectional view along the line A—A indicated in FIG. 2;

FIGS. 3, 4 and 5 are perspective views of possible electrode arrangements on the inner tube.

DETAILED DESCRIPTION OF PREFERRED EMBODIMENTS

Figure 2:
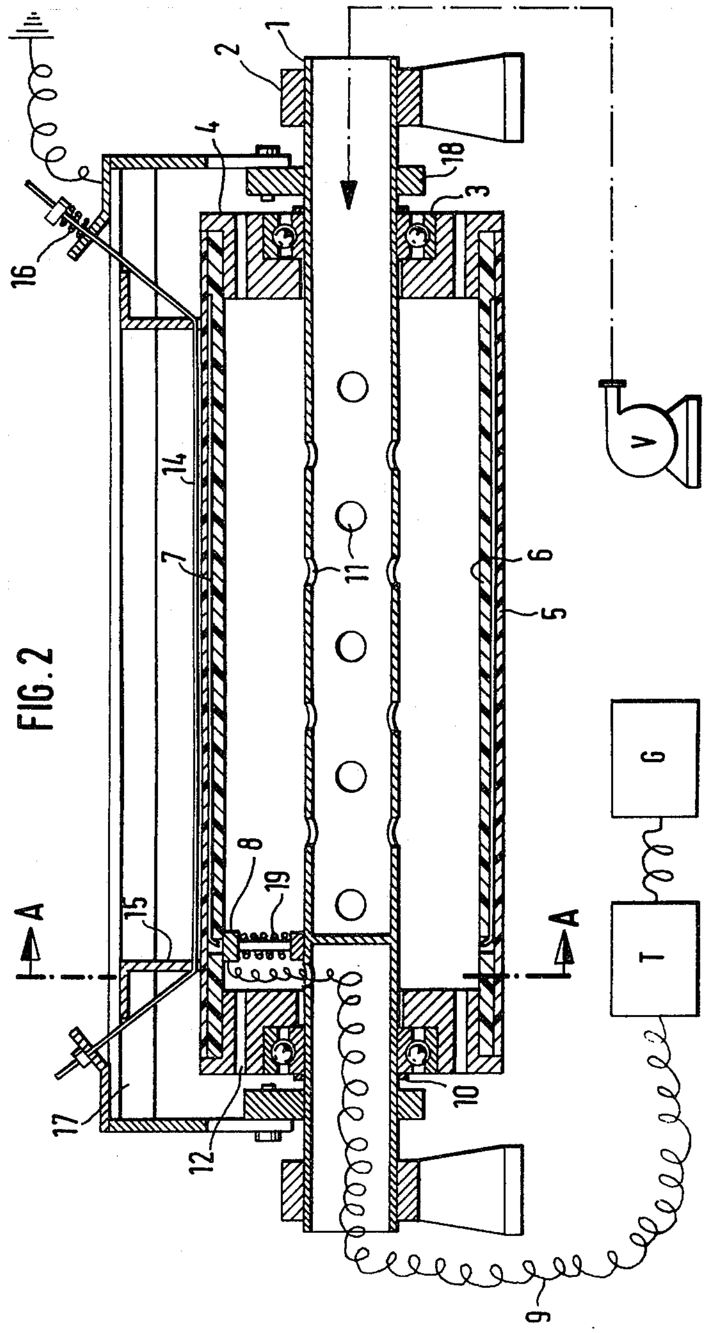
FIG. 2 is a cross-sectional view in axial direction of the device according to the invention.

The present invention provides a device for the surface treatment of film webs by means of an electrical corona discharge, which device comprises at least one roll electrode, at least one grounded counter-electrode placed in relation to the electrode and a generator producing an A.C. voltage, preferably a high-frequency voltage, which is connected to the electrode. The roll electrode is made up of a central axle, two cylindrical end pieces concentrically mounted on the axle and rotatably connected with the axle via bearings, a tube of a dielectric material supported by the end pieces, a feed line between the electrode and the transformer/generator, and at least one bearing bracket supporting the axle. An inner tube is fitted into the tube and carries the electrodes which are connected to the transformer and generator via a slip ring and via the feed line, and the grounded counter-electrodes are designed as point electrodes, in a manner known per se, having the shape of combs, knives, or teeth, preferably, however, of thin wires.

In the device according to the invention, an ideal design of electrodes and counter-electrodes in the form of acute points is achieved. By a drastic reduction of the electrode capacity and of the electrical losses connected therewith, an extremely high energy density is obtained for the discharge process, which cannot nearly be provided by any of the known cylinder or roll electrode systems. This advantage is maintained in any case, even if for particular reasons of construction (larger working width, distortion of the roll body, etc.) an increase in the diameter of the electrode roll becomes necessary. This is due to the fact that the dimensions of the actual electrodes are in no way related to the dimensions of the rotating body.

As there is no relative speed between the roll electrode and the film web to be treated, which is in contact with it, the formation of a pre-treating pattern corresponding to the electrode geometry would normally have to be expected. Surprisingly, such a pattern does not develop. This phenomenon may possibly be explained by a "swinging" or "sweeping" corona discharge generated on account of the relative motion between electrodes and counter-electrodes. Naturally, spacing of the electrodes on the inner tube of the roll is important insofar as this result is concerned, and such spacing should preferably range from about 5 to 10 mm.

A further advantage of the inventive device resides in the fact that it may also be used for pretreating metal foils. In this case, it would only be necessary to rotate the device according to FIG. 1 by 180°, thus directing the electrodes toward the steel rolls, which would have to be grounded. A metal foil passed over the rolls could then be subjected to a corona discharge.

A similarly unexpected advantage of the inventive device, which has proven extremely valuable, in particular for application in coating and printing machines, is that while in conventional corona devices any moisture introduced into the pre-treating station, e.g., in case of tearing off of the substrate, immediately causes flashovers and thus burning-through of the dielectric material, the inventive device is not at all affected by such interferences. Even liquid puddles intentionally produced on the film to be treated do not result in flashovers or interruption of the corona discharge.

Apart from the great number of purely processing-related advantages, the corona device according to the invention has additional positive features. One of these is, undoubtedly, the safety of the electrical equipment attained by disposing all current-carrying parts inside the roll electrode.

In practice, the comparatively simple set-up of the device has proved advantageous. Since the dielectric tubes used have relatively hard surfaces, as opposed to thin soft rubber layers, a considerable decrease in mechanical damage has been experienced (e.g., by knife cuts when "roll wrappers" are removed which occur if the web tears off and reels onto the electrode roll). If, in case of electrical flashovers which cannot entirely be excluded, it should become necessary to replace a defective tube, this operation could easily be performed by the men in the plant using low-priced spare parts which may be stored in the plant itself. In this way, the plant becomes independent of outside firms, and often lengthy repair procedures are avoided.

The inner tube may be equipped with the electrodes in different ways. For example, thin wires or wire-meshing, preferably having a thickness of from about 0.2 to 0.3 mm, may be bonded to the inner tube. As an inappropriate fitting of the inner tube into the tube may, however, cause damage to the electrode, the wires of the wire-meshing are preferably inserted in corresponding grooves which are milled into the inner tube. Preferably, the depth of the grooves is approximately equal to the thickness of the wires or the wire-meshing.

This embodiment ensures that damage to the electrode during fitting of the inner tube is completely avoided.

In another preferred embodiment the electrodes are printed, i.e. they are in the form of printed circuits.

In still another embodiment of the device, the axle of the roll electrode is designed as a hollow axle which is, preferably, provided with bores. If, in this case, the hollow axle has inlet and outlet connections or if the end pieces have corresponding bores, it is possible to pass a cooling medium through the device during the corona discharge treatment to remove heat generated in the process.

Although the relative arrangement of the counter-electrodes and the roll electrode is to a large extent optional, it has proven particularly advantageous to dispose the counter-electrodes according to the radius of curvature of the roll elecrode.

In order to compensate for variations in length of the counter-electrodes, which may be caused by the influence of heat during treatment and would result in a non-uniform surface treatment, the counter-electrodes are preferably connected with springs. The outer and the inner tube of the device are preferably made of the same dielectric material, e.g., in particular, of glass, papers saturated with phenolic or melamine resins, glass-fiber-reinforced epoxy or silicone resins, polyesters or polycarbonates which all have a comparatively scratch-resistant surface and are, therefore, not damaged, for example, by the knife cuts mentioned which become necessary in the case of "roll wrappers." In special cases a flexible dielectric material in form of a hose may, however, be used instead of the mechanically stable outer tube.

The device according to the invention and its mode of operation are now explained in detail by reference to the accompanying drawings, without being limited to the illustrated preferred embodiments.

As can be seen from FIG. 1, the corona device according to the invention is fundamentally composed of a cylindrical roll body W made of a dielectric material and constituted by two tubes 5 and 6 tightly fitted into one another. The roll body acts as electrode and, at the same time, serves as a support for the substrate S to be treated. A frame R hinged on a pivot D is arranged above the cylindrical roll body W and carries the grounded counter-electrodes 14. When the substrate S is passed over the roll body W, the surface of the substrate S which faces away from the rotating roll body is treated by the electrical corona discharge struck between the electrodes 7 disposed between the two tightly fitting tubes 5 and 6 and the grounded counter-electrodes 14 on the outside.

The longitudinal section of FIG. 2 is a further illustration of the configuration of the device according to the invention.

The roll electrode comprises a stationary axle 1 supported in bearing brackets 2. Two cylindrical end pieces 4 are mounted on the axle 1 at a distance from one another and supported on ball bearings 3, so as to be rotatable about the axle 1. The end pieces 4 carry a cylindrical tube 5 made of a dielectric material. Another cylindrical tube 6, which is also made of a dielectric material, is tightly fitted into the tube 5 in such a manner that the two tubes are in close contact with one another over their entire circumference. The electrodes 7 are arranged between the tubes 5 and 6 and are inserted in grooves corresponding to their cross section, milled into the tube 6 over its entire circumference. By way of the slip ring segment 8 and the feed line 9, the electrodes 7, which are preferably thin metal wires having a thickness of about 0.2 to 0.3 mm, are supplied from a generator G with high-frequency A.C. which has been stepped up in the transformer T. The complete roll body is secured against axial displacement by means of clamping rings 10. The slip ring segment 8 is forced against the electrodes by a spring 19.

As heat is produced in the course of the pretreatment process, the temperature of the entire unit is controlled by a gaseous medium, which may most simply be air, introduced through the hollow axle 1 from the compressor V and entering into the roll electrode through the radial distributor bores 11. The gaseous medium escapes from the roll electrode through the bores 12 provided in the end pieces 4. If necessary, maintenance of the proper temperature of the roll electrode may be improved by using the electrode in combination with steel or rubber rolls of an adjustable or controllable temperature, as indicated in FIG. 1 by rolls 13. This is possible due to the absence of any electrical voltage in the contact area. It is also possible to control the inside temperature of the device by introducing a liquid, e.g., by using electrically non-conducting substances, such as distilled water, or transformer or silicone oils. In this case the bores 12 in the end pieces must be closed.

The counter-electrode required in the process is arranged above the described roll electrode. The counter-electrode also comprises thin metal wires 14, disposed at a distance of preferably from about 1 to 2 mm from the roll electrode. The position of the wires 14 relative to the roll electrode is fixed by the segmented discs 15 adapted to the radius of the roll body. The pressure springs 16 produce the necessary pre-tensioning, and they also balance thermal expansions in the longitudinal direction as well as any other sagging. The counter-electrodes are suspended in a frame element 17 which may be swung away on the pivot D in order to facilitate introduction of the substrate to be treated. The frame element 18, on the other hand, is tightly fastened to the axle 1.

FIGS. 3, 4 and 5 show possible configurations of the electrodes 7 on the inner tube 6. While FIG. 3 depicts the technically simplest, axially parallel arrangement of the electrodes on the support cylinder 6, FIGS. 4 and 5 represent examples of modified electrode arrangements. The former illustrates a parallel, helical arrangement of plural wires, whereas the latter illustrates two counter-posed parallel, helical arrangements forming a criss-cross pattern of electrode wires.

What is claimed is:

1. A device for the surface treatment of film webs by means of an electrical corona discharge in order to render the surface suitable for printing or to increase its bonding strength, comprising:

at least one grounded counter-electrode comprised of a point electrode;

at least one roll electrode rotatably positioned adjacent to said counter-electrode, said roll electrode comprising an outer tube comprised of dielectric material, an inner tube comprised of dielectric material removably fitted coaxially inside of said outer tube and a plurality of electrodes carried on the outside surface of said inner tube; and means for supplying an A.C. voltage to said electrodes.

2. A device according to claim 1, wherein said A.C. voltage supplying means comprises a generator, a slip ring segment contacting said electrodes and a lead wire connecting said generator and said slip ring segment.

3. A device according to claim 2, wherein said A.C. voltage supplying means further includes a transformer connected to said generator.

4. A device according to claim 2, wherein said generator is a high frequency voltage generator.

5. A device according to claim 1, wherein said roll electrode further comprises a central axle, two annular end pieces concentrically and rotatably mounted on said axle, said end pieces supporting said outer tube at each end thereof.

6. A device according to claim 5, wherein said axle is a hollow axle.

7. A device according to claim 6, wherein said hollow axle includes bores in the wall thereof.

8. A device according to claim 7, wherein said end pieces include bores axially therethrough, and said device further includes means for circulating a fluid through said axle via said bores.

9. A device according to claim 1, wherein said electrodes comprise thin wires bonded to said inner tube.

10. A device according to claim 1, wherein said electrodes comprise thin wires inserted in grooves provided on said inner tube.

11. A device according to claim 1, wherein said electrodes comprise printed circuits on said inner tube.

12. A device according to claim 1, wherein said counter-electrodes are arranged along the radius of curvature of said outer tube.

13. A device according to claim 1, further including springs connected to said counter electrodes.

14. A device according to claim 1, wherein said inner and outer tubes comprise the same dielectric material.

15. A device according to claim 14, wherein said inner and outer tubes comprise glass, paper saturated with a phenolic or melamine resin, a glass-fiber-reinforced epoxy or silicone resin, a polyester or a polycarbonate.

16. A device according to claim 1, wherein said counter-electrodes are shaped as thin wire electrodes.

17. A device according to claim 1, wherein said counter-elecrode is spaced sufficiently close to said roll electrode that the surface of the film web is modified by the corona discharge to render it suitable for printing or to increase its bond strength.

18. A device according to claim 17, wherein said counter-electrode is spaced from about 1 to 2 mm from said roll electrode.

19. A device according to claim 1, wherein said electrodes are spaced a distance from one another of from about 5 to 10 mm.

* * * * *